United States Patent [19]

Sahara

[11] Patent Number: 5,097,718
[45] Date of Patent: Mar. 24, 1992

[54] INPUT SHAFT MOUNTING STRUCTURE IN INTERMITTENT DRIVING APPARATUS

[75] Inventor: Shinsuke Sahara, Osaka, Japan

[73] Assignee: Tsubakimoto Chain Co., Osaka, Japan

[21] Appl. No.: 581,283

[22] Filed: Sep. 12, 1990

[30] Foreign Application Priority Data

Nov. 6, 1989 [JP] Japan .............................. 1-129087[U]

[51] Int. Cl.⁵ ........................ F16H 57/12; F16H 27/04
[52] U.S. Cl. ..................................... 74/396; 74/84 R; 384/255
[58] Field of Search ............... 74/84 R, 396, 425, 500, 74/571 M; 384/255

[56] References Cited

U.S. PATENT DOCUMENTS

| 2,542,388 | 2/1951 | Brodhead | 74/500 |
| 2,648,230 | 8/1953 | Stallsmith | 74/396 |
| 3,753,375 | 8/1973 | Colletti | 74/396 X |
| 4,955,243 | 9/1990 | Kato et al. | 74/84 R |

FOREIGN PATENT DOCUMENTS 63-145017  9/1988  Japan .

*Primary Examiner*—Allan D. Herrmann
*Attorney, Agent, or Firm*—Flynn, Thiel, Boutell & Tanis

[57] ABSTRACT

An intermittent driving apparatus having input and output shafts disposed in perpendicular but nonintersecting relationship, and joined together by an intermittent drive coupling for transmitting rotation of the input shaft intermittently to the output shaft. The input shaft extends through an eccentric opening formed on a ring which is disposed within an opening formed in the housing. The ring can be angularly adjusted relative to the housing to vary the position of the axis of the input shaft. The ring is fixed to the housing by a securing pin, and a ring-shaped cover is press-fit into the angular gap between the ring and the housing.

3 Claims, 3 Drawing Sheets

INPUT SHAFT MOUNTING STRUCTURE IN INTERMITTENT DRIVING APPARATUS

FIELD OF THE INVENTION

The present invention relates to an input shaft mounting structure for an intermittent driving apparatus adapted to transmit input torque to an output shaft intermittently, the two shafts intersecting rectangularly with each other.

BACKGROUND OF THE INVENTION

An example of an intermittent driving apparatus is disclosed in Japanese Utility Model application Laid-open No. 145017/1988, and is shown in FIG. 2 hereof.

The intermittent driving apparatus 10 shown in FIG. 2 comprises an output shaft 11 and an input shaft 12 intersecting rectangularly with each other. The input shaft 12 is supported by a tapered roller bearing 14 relative to the eccentric ring 13 which is received by the housing 15. By revolving the eccentric ring 13 slightly, the position of the axis of the input shaft 12 may be adjusted. After the adjustment, the eccentric ring 13 is secured to the housing 15 by fastening a bolt 17 which extends through a covering plate 16.

The above-mentioned structure, however, has the drawback that the number of parts is relatively large and the bolt fastening operation is required in the assembly work.

Moreover, since an O-ring 18 is provided between the outer circumference of the eccentric ring 13 and the housing 15 so that the lubricating oil will not leak, the frictional resistance caused by the O-ring 18 gives difficulty to the adjustment operation of the eccentric ring 13.

SUMMARY OF THE INVENTION

The present invention provides, in an intermittent driving apparatus having rectangularly intersecting input and output shafts and an eccentric ring held by a housing for supporting said input shaft and adjusting the position of the axis thereof, an improved input shaft mounting structure wherein said eccentric ring is secured to said housing by means of a pin and a ring-shaped cover which is press-fit into the gap between said eccentric ring and the housing.

According to the present invention, the eccentric ring is secured to the housing by means of a pin; and thus, the number of parts may be reduced, and the bolt fastening operation may be abolished, which contributes to the simplification of structure and assembly work. Furthermore, since the leakage of lubricating oil may be prevented by means of a ring-shaped cover which is press-fit from outside after the adjustment of the eccentric ring has been completed, the cover poses no obstacle to the adjustment work of the eccentric ring, facilitating the adjustment work.

DETAILED DESCRIPTION

Figure 1:
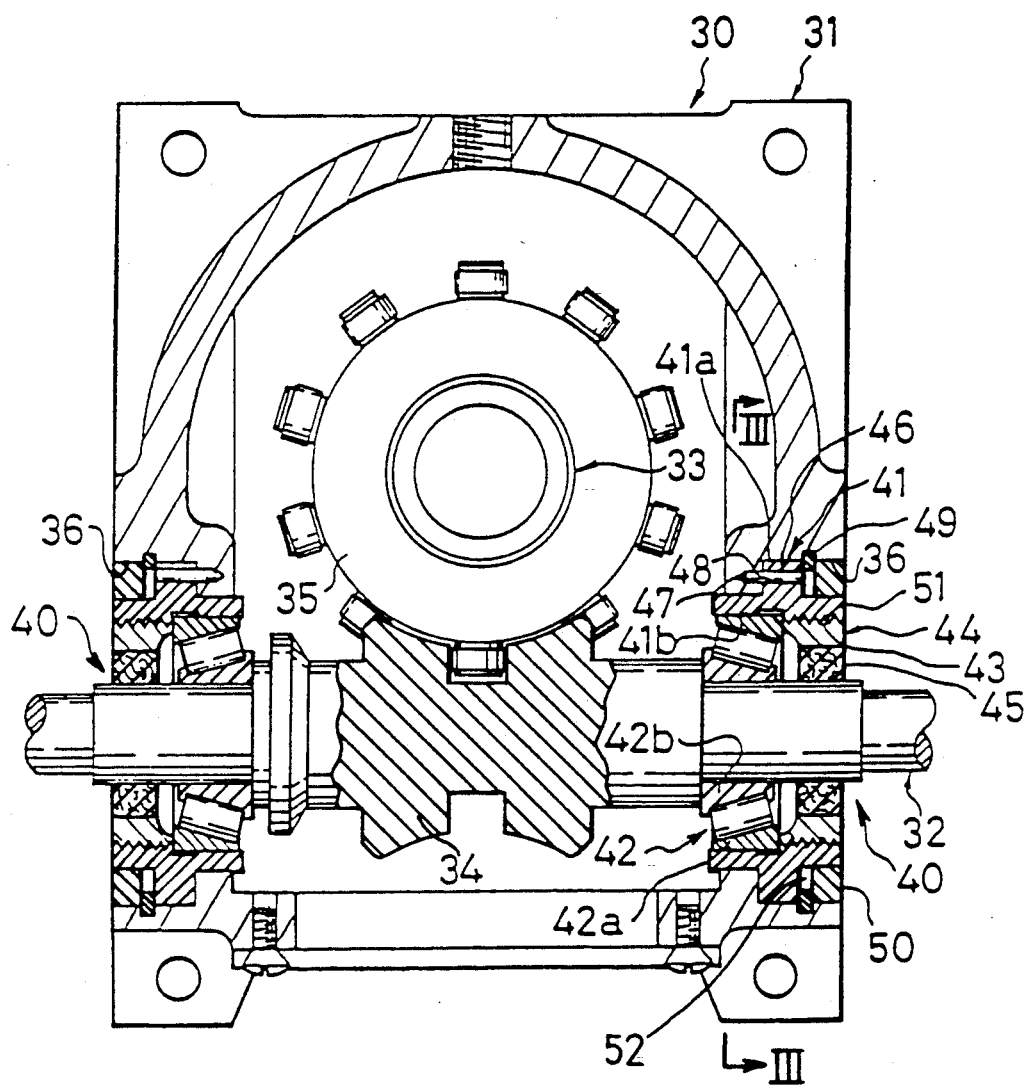
FIG. 1 is an axial section of an input shaft mounting structure according to the present invention.
Figure 2:
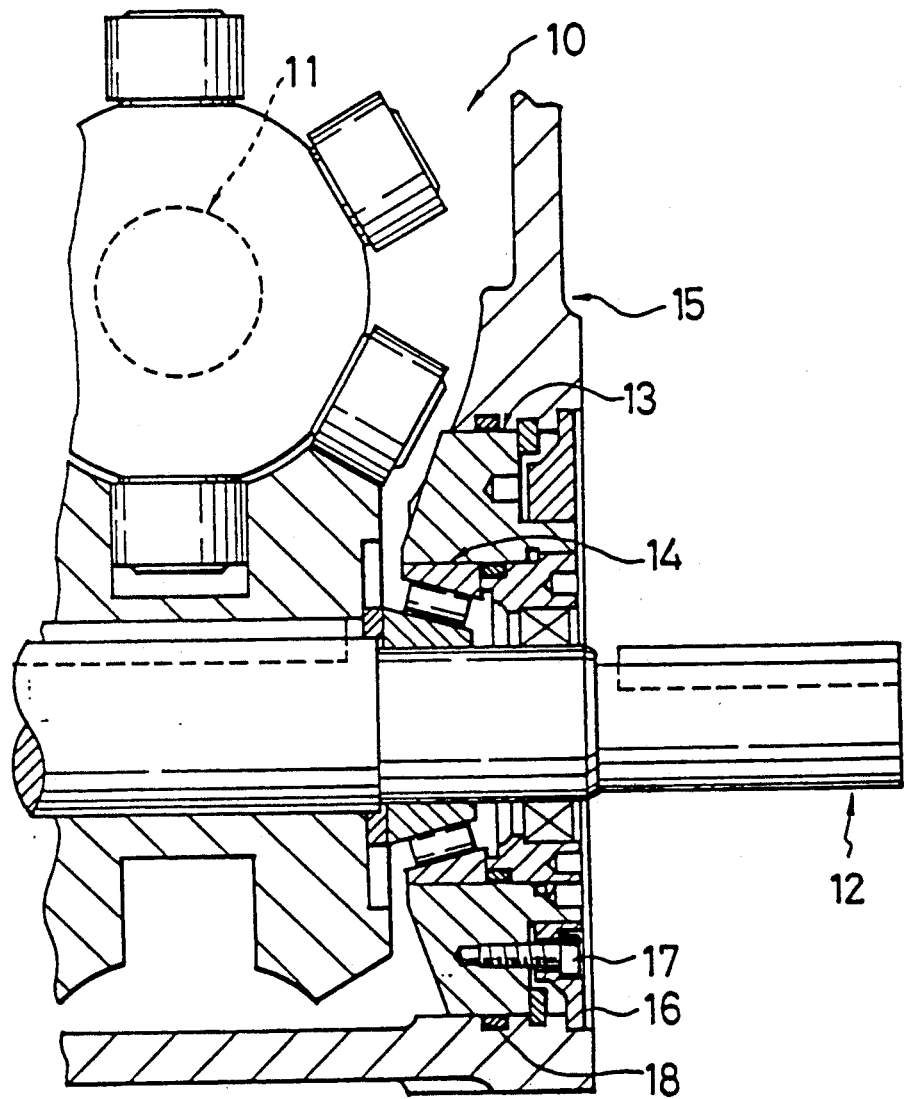
FIG. 2 is an axial section of an input mounting structure according to the prior art.
Figure 3:
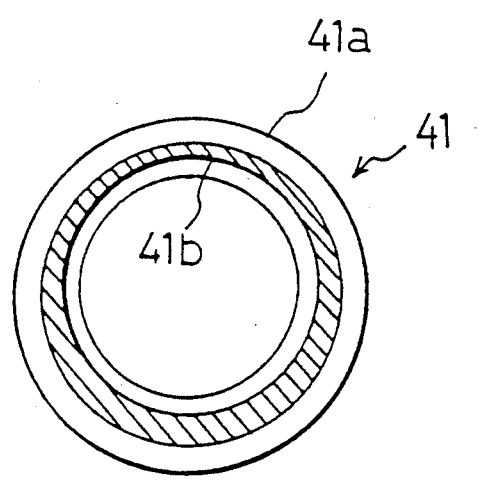
FIG. 3 is a cross-sectional view along line III—III of FIG. 1.

FIG. 1 shows an axial section of an input shaft mounting structure of an intermittent driving apparatus 30. The apparatus 30 comprises a housing 31 which accommodates rectangularly intersecting input shaft 32 and output shaft 33. That is, the axes of shafts 32 and 33 extend perpendicularly but do not intersect. By operation of a cam 34 and a turret 35 mounted on and cooperating between the shafts, the continuous rotation of the input shaft 32 may be intermittently transmitted to the output shaft 33.

The input shaft 32 is supported by a pair of shaft support mechanisms 40, 40 within the apertures 36, 36 respectively formed in the housing 31. Since the two shaft support mechanisms are symmetrical, only the right side shaft support mechanism will be described.

An eccentric ring 41 is rotatably provided within the housing apparatus 31; and the inner circumference 41b thereof is slightly eccentric relative to the outer circumference 41a thereof. A part of the inner circumference 41b is adapted to receive a tapered roller bearing 42 into which the input shaft 32 is press-fit. The remaining part of the inner circumference 41b is internally threaded so as to threadedly receive a pusher ring 44 for pushing the outer ring 42a of the tapered roller bearing 42 inwardly of the housing 31.

An oil seal 45 is inserted into the annular gap formed between the pusher ring 44 and the input shaft 32. The outer circumference 41a is formed with a flange 46 having an aperture or opening 48 extending axially therethrough so as to receive a pin 47 for fixing the eccentric ring 41 to the housing 31. The flange 46 is secured within the aperture 36 by means of a snap ring 49. A ring-shaped cover 50 is press-fit into the annular gap 52 between the eccentric ring 41 and the housing 31.

The procedure for adjusting the position of the axis of the input shaft 32 will now be described.

Firstly, the eccentric ring 41 into which the pin 47 is not inserted is rotated by degrees to adjust the positioning of the axis of the input shaft 32 such that the input shaft 32 and the output shaft 33 may be smoothly rotated relative to each other.

After such an adjustment, the pin 47 is inserted into the aperture 48 of the flange 46 and further hammered into the housing 31 such that the eccentric ring 41 may be prevented from rotating relative to the housing 31. Thereafter, the pusher ring 44 is threaded such that the outer ring 42a of the tapered roller bearing 42 is pushed inwardly so as to impart appropriate preloading thereto; and as a result of the reaction thereof, the eccentric ring 41 is pushed outwardly of the housing 31 such that it is pressed against the snap ring 49. Lastly, the ring-shaped cover 50 is mounted.

A sealing adhesive (not shown) is applied onto the surface of the outer thread 51 of the pusher ring 44 before it is threaded to the internal thread 43 so that lubricating oil (not shown) within the housing may be prevented from leaking therefrom.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an intermittent driving apparatus having an input shaft and an output shaft rectangularly intersecting with each other, and an eccentric ring held by a housing for rotatably supporting said input shaft and adjusting the position of the axis thereof, said eccentric ring and said housing defining an annular gap therebetween, wherein the improvement comprises: said eccentric ring is secured to said housing by means of a pin and a ring-shaped cover is press-fit into said annular gap between said eccentric ring and the housing.

2. In an intermittent driving apparatus having a housing, input and output shafts rotatably supported on said housing so that the axes of said shafts extend perpendicularly with respect to one another in nonintersecting relationship, a drive transmitting arrangement coupled between said input and output shafts for transmitting rotation of said input shaft in an intermittent manner to said output shaft, said housing having an opening therein in which is supported an eccentric ring which supportingly surrounds said input shaft for adjusting the position of the axis thereof, the improvement comprises: the eccentric ring is stationarily secured to the housing by a pin, and a ring-shaped cover is press-fit between said ring and said housing.

3. An apparatus according to claim 2, wherein said eccentric ring has an eccentric opening therewithin, a tapered roller bearing arrangement supported within said eccentric opening formed within said ring for rotatably supporting said input shaft, a pusher ring threadedly engaged within said eccentric ring and abutting an axial outer end of an outer race of said bearing, said pusher ring and said input shaft defining an annular gap therebetween, and a seal member interposed in said annular gap between said pusher ring and said input shaft.

* * * * *